Patented Aug. 4, 1942

2,292,200

UNITED STATES PATENT OFFICE 2,292,200

PIGMENTED EMULSION AND METHOD OF PRODUCING IT

Norman S. Cassel, Ridgewood, N. J., assignor to Interchemical Corporation, New York, N. Y., a corporation of Ohio No Drawing. Application October 10, 1939, Serial No. 298,761

6 Claims. (Cl. 260—29)

This invention relates to pigmented emulsions particularly useful as textile printing pastes, and has particular reference to a method of pigmenting water-in-lacquer emulsions, particularly such as are useful in textile printing.

Conventional textile printing is ordinarily done with water solutions of dyestuffs containing water soluble thickening agents in sufficient quantity to retard the spreading of the color on the fabric after printing. The dyestuff is fixed onto the fabric by some chemical process and the binding agent is then washed out of the fabric. The time and expense involved in this after treatment, added to the originally high color cost for light and tub-fast dyes, has been a major problem in textile printing. An unsolved problem has been the reproduction of very fine designs. Since the pastes spread on the fabric after printing when thin enough to be removed sharply from fine engravings, giving blurred designs, it has been found impossible to use photogravure cylinders or extremely fine mill and dye engravings. Attempts to modify these pastes by addition of wetting agents and emulsification of oils therein have not solved the basic difficulties.

The use as printing pastes of colored lacquers (which, for the purpose of this application are defined as dispersions of color in vehicles consisting of a solution of a plastic or solid film forming, water resistant binder such as a cellulose derivative or a resin, in an organic solvent or mixture of solvents) has been attempted in order to overcome the difficulties with prior art pastes, but has not been successful commercially. Relatively few lacquer compositions withstand both dry cleaning and washing; and such compositions as are resistant have been generally unacceptable due to the fact that the fabrics, when printed with these lacquers, develop an undesirable stiff feel (known to the trade as "hand"), to the necessity for using large amounts of color to obtain deep shades, and to the tendency of colored markings to rub off onto other clothing and leave a mark (known as "crocking").

A new type of textile printing paste has been proposed which eliminates the disadvantages of the conventional dye printing pastes and avoids the difficulties which have been encountered in the prior art lacquer printing pastes. These new pastes are emulsions in which an outer continuous water-immiscible-lacquer phase is thickened by an inner aqueous phase which is at least 20 per cent. of the total emulsion, by weight. Preferably, the binder of the lacquer is one which is originally soluble in ordinary organic solvents and which can be converted into an insoluble state after printing—most desirably, a readily heat-polymerizable synthetic resin, best exemplified by the plasticized urea formaldehyde resins.

I have discovered that pastes of this type, and other water-in-lacquer emulsions, may be pigmented very simply and economically, and with the production of better and cleaner colors in most instances, by emulsifying a solution of a reacting component as discontinuous droplets in a continuous organic liquid phase (preferably a lacquer) and mixing the emulsion with an aqueous solution, or a similar emulsion of an aqueous solution, of a second reacting component which forms a pigment on reaction with the first component.

The added water is carefully emulsified into the original emulsion, or the two emulsions are mixed. Under these conditions, the two reacting components are rapidly brought into contact with one another in small quantities, and under substantially uniform conditions. Most pigments, as they form, flush immediately into the lacquer, thus preventing excessive contact with the original solution from which they are precipitated; in this manner, the original very small particle size is prevented from growing by crystal growth or agglomeration due to salt occlusion. As a result of the controlled uniform condition of precipitation, and the immediate flushing, considerably brighter pigments of greater strength are obtained than in conventional prior art practice.

In manufacturing textile printing pastes in accordance with my invention, the emulsions of the two components may be prepared so that the mixture of the two emulsions is the finished printing paste, or the necessary additional ingredients may be added to complete the paste.

If desired, the process may be used to produce pigmented lacquers containing no water, by breaking the emulsion by the addition of suitable agents, and separating the water from the pigmented lacquer. Furthermore, pigmented lacquer-in-water emulsions may be prepared by adding water containing emulsifying agents under such conditions as to cause inversion of the emulsions.

Where the emulsion is to be used directly as a printing paste, the soluble salts of course remain in solution in the aqueous phase of the emulsion, having substantially no effect on it. However, I avoid any excess of color salts, or salts having a chemical action on cloth, in the preparation of these pastes.

Typical examples of my invention are the following:

EXAMPLE 1.—CHROME YELLOW PASTE

A solution of

| | Parts by weight |
|---|---|
| Alkyd resin | 7 |
| in | |
| Toluene | 7 |
| is diluted with | |
| Pine oil | 5 |
| Solvesso #3 (hydrogenated petroleum naphtha—B. R. 175–210° C.) | 11 |
| to which is added with stirring | |
| Basic lead acetate solution | 27 |

(containing 1.077 lbs. of lead oxide (PbO) to the gallon and 0.188 lb. of acetic acid to the gallon) producing an emulsion of basic lead acetate in lacquer.

A solution of

| | Parts by weight |
|---|---|
| Alkyd resin | 4.25 |
| in | |
| Toluene | 4.25 |
| is diluted with | |
| Pine oil | 3 |
| Solvesso #3 | 7.0 |
| to which is added with stirring, 17 parts of an aqueous solution containing | |
| Sodium dichromate dihydrate $Na_2Cr_2O_7 \cdot 2H_2O$ | 1.4 |
| Aqueous sulfuric acid (15% $H_2SO_4$ by weight) | 0.6 |
| Water | 15.0 |

The two emulsions are mixed well, and there is then added 7.5 parts of an organic-soluble urea formaldehyde resin solution containing—

| | Parts by weight |
|---|---|
| Urea resin | 3.75 |
| Xylene | 1.50 |
| Butanol | 2.25 |

The entire mixture is passed through a colloid mill. This composition contains approximately 4.6 parts by weight of chrome yellow.

A print on cotton shows strength comparable with a similar paste made with conventionally prepared chrome yellow. After thermosetting, the print is resistant to dry cleaning, crocking and fusing. Its resistance to washing is as good as with conventionally prepared chrome yellow.

The alkyd resin of the example can be made by reacting 148 parts of phthalic anhydride, 110 parts glycerol and 125 parts castor oil fatty acids at 230° C., in the presence of $CO_2$, until the acid number is about 8; it is preferably dissolved in equal parts of toluene while warm, directly after making.

The organic soluble urea formaldehyde resin can be made in any manner well known to the art. A preferred method of producing such a resin comprises reacting urea with 37% aqueous formaldehyde at a pH of about 4.5, using 2.5 mols of formaldehyde per mol of urea. The resinous watery initial condensate produced is then mixed with butanol, and refluxed for several hours; more butanol and some xylol are added, and the water, butanol and xylene are removed until the desired water-free solution of the resin is obtained.

EXAMPLE 2.—BLUE PRINTING PASTE

Solution 1

The sodium salt of the ortho toluidide of beta oxynaphthoic acid ("Naphthol AS–D") is prepared in the following manner:

18.8 grams Naphthol AS–D (General Dyestuff Corp.), corresponding to 0.0679 mole, is well pasted with 20 c. c. Turkey red oil (sulfonated castor oil) and 50 c. c. hot water. To the above 4.1 grams solid caustic soda dissolved in 50 c. c. hot water are added. The solid NaOH corresponds to .1025 mol., and is in the proportion of 3 to 2 to the naphthol. The solution may be heated if necessary to quantitatively form all the naphtholate, the loss of water from evaporation being later replaced. This naphtholate solution is cooled to approximately room temperature (20–25° C.) before it is used.

Solution 2

The diazonium salt of 4-benzoyl amino-2:5 diethoxy aniline (Fast Blue BB Base) is prepared as follows:

20.4 g. Fast Blue BB Base (General Dyestuff Corp.), corresponding to 0.0679 mole, is pasted with 18.5 c. c. HCl 20° Baumé and 150 c. c. cold water. To the above is added in a thin stream 4.7 grams sodium nitrate dissolved in 25 c. c. cold water. The base is diazotized for 30 minutes at 15° C. At the end of this time it is neutralized with 9.38 grams sodium acetate dissolved in 25 c. c. cold water. This diazo solution is kept cold, and is preferably used immediately after neutralization.

Solution 3

This is the organic phase, and is made of

| | Grams |
|---|---|
| Urea resin solution of Example 1 | 100 |
| Solution of alkyd resin of Example 1 (50% in toluene) | 300 |
| Hydrogenated petroleum solvent (B. R. 175–210° C.) | 80 |
| Pine oil | 20 |

Solution 1 is added to solution 3 in a thin stream while stirring rapidly, preferably at a rate of about 10,000 R. P. M., to produce an emulsion of solution 1 in solution 3.

After solution 1 is in, the diazo solution (solution 2 made as described above) is slowly poured into the emulsion, while rapidly stirring. As the diazo solution is added, the viscosity increases. In this case, the viscosity is adjusted for textile printing by adding to the paste 40 grams pine oil and 64 grams cold water (25° C.).

After coupling, the paste is stirred on a low speed laboratory mixer (about 100 R. P. M.) for 15 minutes to complete coupling. The ink is then milled in a colloid mill at 0.002–0.005 inch. On examination under the microscope, the pigment is in the organic phase. The paste may be printed immediately, or preferably allowed to stand before being printed. It may be printed in the mass tone or may be diluted to any desired color strength with an unpigmented emulsion.

EXAMPLE 3.—VIOLET PASTE

Solution 1

The sodium salt of beta oxy naphthoic acid anilide (Naphthol AS) is made as in Example 2 from:

| | |
|---|---|
| Naphthol AS grams | 19.8 |
| Turkey red oil in 25 c. c. hot water c. c. | 20 |
| NaOH in 50 c. c. hot water grams | 6 |

The solution is not filtered.

Solution 2

The diazonium salt of 6 benzoyl amino-4 methoxy-3 amino toluene (Violet B base—general) is made as follows:

19.3 grams Violet B base is pasted with 5.8 grams sodium nitrite and 25 c. c. hot water. This is cooled with 133 grams ice and water. To the above is added 20 c. c. HCl 20° Baumé in 51 c. c. cold water. It is diazotized 30 minutes at 60° F., then neutralized with 11.6 grams sodium acetate. 15 c. c. acetic acid, 80% technical, is added. The solution is perfectly clear and is not filtered.

Solution 3

|  | Grams |
|---|---|
| Urea resin solution of Example 1 | 100 |
| Alkyd resin solution of Example 2 | 300 |
| Pine oil | 80 |
| Hydrogenated petroleum derivative of Example 2 | 120 |
| Organic phase | 600 |

All of solution 1 is emulsified into organic phase. Then the diazo solution is added slowly with good stirring. Mix well, put through colloid mill at 0.005" clearance. The ink contains 4% pigment and gives a very pleasing bright print either in the mass or cut ⅕ with an unpigmented emulsion.

EXAMPLE 4.—RED PASTE

Solution 1

The sodium salt of beta oxy naphthoic acid alpha naphthalide (Naphthol AS-BO) is prepared in a similar manner as in Example 2 from:

| Naphthol AS-BO (0.0812 mole) | grams | 25.40 |
|---|---|---|
| Turkey red oil/50 c. c. hot H₂O | c. c. | 20.00 |
| NaOH/100 hot H₂O | grams | 7.75 |

The NaOH corresponds to 0.194 mole, and is in the proportion of 3 to 2 to the naphthol. The solution is not filtered, but may be if desired.

Solution 2

The diazonium salt of 2 methoxy-4-nitro aniline (Fast Red B base) is prepared in the following manner:

13.6 g. Red B base, corresponding to 0.0812 mole, is pasted with 5.85 g. NaNO₂ and 25 c. c. hot water. It is then cooled. Add the above to 23.1 c. c. HCl (20° Baumé) in 150 c. c. cold water. The base is diazotized, with external cooling, for 30 minutes at 10–15° C., then neutralized with 11.5 grams sodium acetate. 3 c. c. acetic acid, 80% technical, are added. The solution need not be filtered, but may be if desired.

Solution 3

|  | Grams |
|---|---|
| Urea resin solution of Example 1 | 100 |
| Alkyd resin solution of Example 2 | 300 |
| Pine oil | 20 |
| Hydrogenated petroleum derivative of Example 2 | 80 |
| Organic phase | 500 |

The entire naphtholate solution is added to the organic phase (solution 3) as in Example 2. Then the diazo solution is added slowly with good stirring, the diazonium compound coupling with the naphtholate and flushing into the organic phase. The mix is stirred at 100 R. P. M. for 15 minutes. The viscosity was adjusted for printing by adding 80 grams hydrogenated petroleum derivative and 40 grams water. It is milled at 0.002–0.005" clearance in a colloid mill. The paste may be printed in the mass, or cut to various depths with a clear emulsion. A fuschia red is obtained with a cut of one base paste to five clear. The color is very fast to light and stands up exceptionally well on washing.

EXAMPLE 5.—SCARLET PASTE

Solution 1

The naptholate of beta oxy naphthoic acid anilide (Naphthol AS) is prepared in a similar manner as in Example 2 from:

| Naphthol AS (0.183 mole) | grams | 48.2 |
|---|---|---|
| Turkey red oil/50 c. c. hot water | c. c. | 20.0 |
| NaOH/50 c. c. hot water (0.3 mole) | grams | 12.0 |

The solution is not filtered, but may be if desired.

Solution 2

59.2 grams Fast Scarlet 2G salt (the salt of Schultz No. 50) is dissolved in 260 grams of cold water, and filtered.

Solution 3

|  | Grams |
|---|---|
| Urea resin solution of Example 1 | 100 |
| Alkyd resin solution of Example 2 | 300 |
| Pine oil | 20 |
| Hydrogenated petroleum derivative of Example 2 | 80 |

Emulsify the entire naphtholate solution into the organic phase. Then add the diazo solution slowly with good stirring at room temperature (25° C.). Put through colloid mill at 0.002–0.005" clearance. A bright scarlet ink is obtained.

EXAMPLE 6—LACQUER IN WATER EMULSION

Solution 1

The sodium salt of beta oxy naphthoic acid anilide is prepared by pasting 24.7 grams with 45 c. c. hot water, adding to the paste a solution of 5.65 grams NaOH in 50 c. c. hot water.

Solution 2

A diazo solution is made by pasting 14.2 grams paranitro ortho anisidine (Scarlet G base) with 38.5 c. c. HCl (20° Baumé). 150 grams of water and ice are added to obtain a mixture at 10° C. A solution of 7.1 grams sodium nitrate in 25 c. c. water are added, and the diazotization is allowed to proceed for 10 minutes at 10° C. 24.2 grams sodium acetate and 7 c. c. of 80% acetic acid are added, and the solution is filtered.

Solution 3

The organic phase of Example 3 is divided into two equal parts of 300 grams each and solution 1 is stirred into one, solution 2 into the other. The two emulsions are mixed with stirring. Finally, 154 grams of water were added, and the material passed through a colloid mill at 0.002–0.005" clearance.

|  | Parts |
|---|---|
| The above paste | 15 |
| Pine oil | 10 | and

|  | Parts |
|---|---|
| Hydrogenated petroleum solvent | 48 | are mixed and added, with stirring, to a solution of

|  | Parts |
|---|---|
| Sodium lauryl sulfate | 2 | in

|  |  |
|---|---|
| Water | 25 |

The emulsion is inverted, and a lacquer-in-water emulsion is obtained, which may be diluted with water to be used as a dye bath for textiles.

A principal advantage of my invention is its economy. Filtration and washing of the pigment is avoided, the impurities remaining in the water while the pigment flushes into the binder, thus freeing the pigment of the impurities. Furthermore, there is no need for expensive dispersion of the pigment in the vehicle, in most cases, it is already present in the very finest possible particle size—its size at precipitation.

The method is, of course, limited by the amount of reacting components which can be carried in the water emulsifiable in the organic liquid. High concentrations of inorganic pigments, which are often needed in many coating compositions, cannot be attained; the method is particularly useful with organic pigments, particularly of the azo class, which can be made in concentrations as high as can be obtained by ordinary means, and often can be obtained in even higher strength. The method cannot of course be economically used for pigments such as titanium dioxide, lithopone, cadmium red, etc. which require calcination at elevated temperatures.

While I have shown my invention as carried out with only one type of lacquer, any other lacquers may be used which possess the property of producing water-in-lacquer emulsions. Thus, I have carried out my new process in water-in-lacquer emulsions of ethyl cellulose and other cellulose derivative lacquers, in various synthetic resin lacquers, and in many natural resin lacquers.

My method may be used not only to produce textile printing pastes, and pigment dye baths for textiles, but it is also useful in the production of surface coating compositions and ordinary printing inks. Even where water-free compositions are required, the emulsions produced by my method can be broken by well known means, to recover the water-free pigmented composition.

Obvious modifications of my invention will occur to those skilled in the art, without departing from the scope thereof, which is defined in the claims.

I claim:

1. The method of producing a water-immiscible composition colored with a pigment having a strength and brightness at least equivalent to that produced by conventional processes, which comprises adding to an emulsion of an aqueous solution of a pigment-forming reactant in a substantially unpigmented water-immiscible organic film-forming liquid, an aqueous solution of a second reactant which forms a pigment with the first reactant which will flush into and color the organic liquid, and mixing the emulsion and added liquid to form a composite emulsion of water containing the water-soluble residues of the reaction distributed as a disperse phase through the pigmented water-immiscible liquid, the aqueous disperse phase comprising at least 20% of the emulsion by weight.

2. The method of producing a water-immiscible composition colored with a pigment having a strength and brightness at least equivalent to that produced by conventional processes, which comprises adding to an emulsion of an aqueous solution of a pigment-forming reactant in a substantially unpigmented water-immiscible organic film-forming liquid comprising a solution of a film-forming pigment binder in a volatile organic solvent, an aqueous solution of a second reactant which forms a pigment with the first reactant which will flush into and color the organic liquid, and mixing the emulsion and added liquid to form a composite emulsion of water containing the water-soluble residues of the reaction distributed as a disperse phase through the pigmented water-immiscible liquid, the aqueous disperse phase comprising at least 20% of the emulsion by weight.

3. The method of claim 2, in which the emulsion is broken after it is produced, and the water removed to produce a water-free lacquer.

4. The method of claim 2, in which the emulsion is inverted after it is produced, to form a lacquer-in-water emulsion.

5. The method of claim 2, in which the water-soluble reactants are a diazonium compound, and a compound capable of coupling therewith.

6. The method of producing a textile printing composition colored with a water-insoluble azo pigment, and comprising a water-in-lacquer emulsion of an aqueous liquid in a water-immiscible lacquer comprising a solution of a heat-convertible synthetic resin in a volatile organic solvent, which comprises adding to a water-in-lacquer emulsion of a water-insoluble azo pigment-forming reactant in a water-immiscible lacquer, an aqueous solution of the remaining reactants necessary to produce the azo pigment, and mixing the emulsion and the aqueous solution added to form a composite emulsion of water containing the water-soluble residues of the reaction, distributed as a disperse phase through the pigmented water-immiscible lacquer, the aqueous disperse phase comprising at least 20% of the emulsion by weight.

NORMAN S. CASSEL.